US011930266B2

(12) United States Patent
Mizuo

(10) Patent No.: US 11,930,266 B2
(45) Date of Patent: Mar. 12, 2024

(54) LINE-OF-SIGHT DETECTION APPARATUS, IMAGING APPARATUS, LINE-OF-SIGHT DETECTION METHOD, AND NON-TRANSITORY COMPUTER-READABLE STORAGE MEDIUM

(71) Applicant: CANON KABUSHIKI KAISHA, Tokyo (JP)

(72) Inventor: Yoshihiro Mizuo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/845,370

(22) Filed: Jun. 21, 2022

(65) Prior Publication Data

US 2022/0417422 A1 Dec. 29, 2022

(30) Foreign Application Priority Data

Jun. 24, 2021 (JP) ................................ 2021-104994

(51) Int. Cl.
*H04N 23/611* (2023.01)
*H04N 23/63* (2023.01)

(52) U.S. Cl.
CPC ......... *H04N 23/611* (2023.01); *H04N 23/633* (2023.01)

(58) Field of Classification Search
CPC ..... H04N 23/611; H04N 23/633; H04N 23/60
See application file for complete search history.

(56) References Cited

U.S. PATENT DOCUMENTS

| 10,776,989 B1* | 9/2020 | Douglas ................. G06T 19/20 |
| 2010/0128927 A1* | 5/2010 | Ikenoue ............... G06V 40/167 |
| | | 382/199 |
| 2016/0095511 A1* | 4/2016 | Taguchi ................. G06F 3/013 |
| | | 351/209 |
| 2018/0227481 A1* | 8/2018 | Kimura ................. H04N 23/63 |

FOREIGN PATENT DOCUMENTS

| JP | 2018-205648 A | 12/2018 |
| JP | 2020-106552 A | 7/2020 |

* cited by examiner

*Primary Examiner* — Yogesh K Aggarwal
(74) *Attorney, Agent, or Firm* — Canon U.S.A., Inc. IP Division

(57) ABSTRACT

A line-of-sight detection apparatus includes a processor, and a memory storing a program which, when executed by the processor, causes the line-of-sight detection apparatus to function as a line-of-sight detection unit configured to detect a position of a line of sight of a user with respect to a display unit, a subject detection unit configured to detect a subject from an image displayed in the display unit, and a correction value determination unit configured to determine a correction value used by the line-of-sight detection unit such that the position of the line of sight detected by the line-of-sight detection unit matches a position of the subject detected by the subject detection unit.

23 Claims, 11 Drawing Sheets

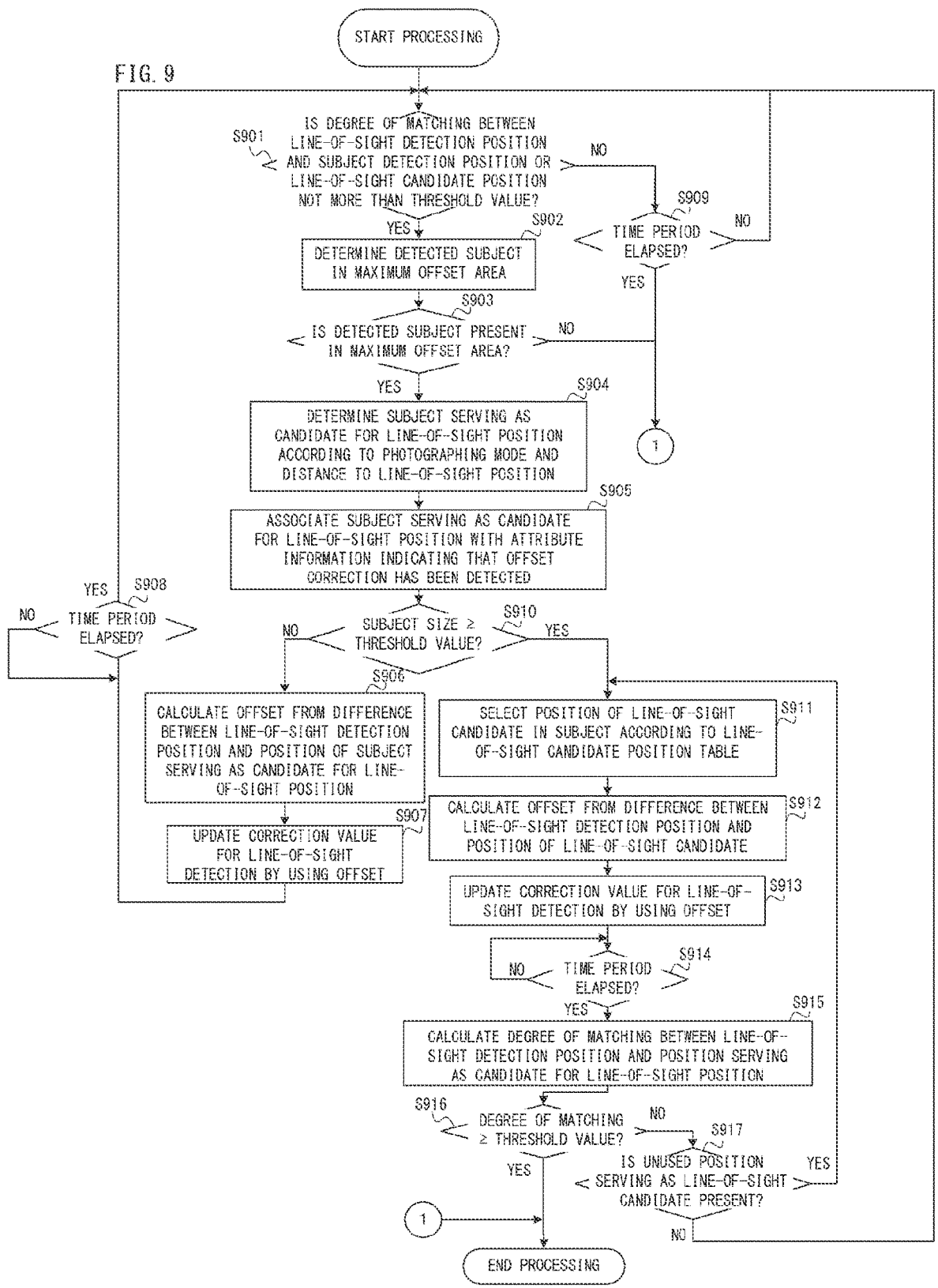

| PRIORITY | PORTION |
|---|---|
| 1 | EYE PART |
| 2 | GRAVITY CENTER |
| 3 | FORELEG |
| 4 | HIND LEG |
| 5 | ... |

LINE-OF-SIGHT DETECTION APPARATUS, IMAGING APPARATUS, LINE-OF-SIGHT DETECTION METHOD, AND NON-TRANSITORY COMPUTER-READABLE STORAGE MEDIUM

BACKGROUND

Field of the Disclosure

The technique in the present disclosure relates to a line-of-sight detection apparatus, an imaging apparatus, a line-of-sight detection method, and a storage medium, and particularly relates to a technique for correcting a difference between a detected line-of-sight position (detection position) and a position (actual position) which a user watches.

Description of the Related Art

In recent years, an imaging apparatus is increasingly automated and made intelligent and, as a result, there is proposed an apparatus which selects a position in space in a direction in which a user looks or a position on a screen, based on information (line-of-sight information) on the line of sight of a user who looks into a viewfinder even when the position is not input manually.

In addition, Japanese Patent Application Publication No. 2020-106552 describes a technique for correcting a difference between a detected line-of-sight position and a position which a user actually watches.

However, in Japanese Patent Application Publication No. 2020-106552, a configuration is adopted in which the user himself/herself specifies the position which the user actually watches, whereby correction of the detected line-of-sight position is performed based on specified position information, hence the user needs to perform the correction manually.

In addition, Japanese Patent Application Publication No. 2018-205648 describes a correction method in which, in the case where an error is present between a detected line-of-sight position and a watch position of a user, a proper subject is selected from among candidates for the subject which are present in a surrounding area, but the correction of the line-of-sight position having the error is not performed. Hereinafter, the detected line-of-sight position is described as a line-of-sight detection position.

SUMMARY

Objects of the techniques in the present disclosure include addressing the foregoing and providing a line-of-sight detection apparatus that corrects an error between a position that a user watches and a line-of-sight detection position with high accuracy.

According to an aspect of the present disclosure, a line-of-sight detection apparatus includes a processor and a memory storing a program which, when executed by the processor, causes the line-of-sight detection apparatus to function as a line-of-sight detection unit configured to detect a position of a line of sight of a user with respect to a display unit, a subject detection unit configured to detect a subject from an image displayed in the display unit, and a correction value determination unit configured to determine a correction value used by the line-of-sight detection unit such that the position of the line of sight detected by the line-of-sight detection unit matches a position of the subject detected by the subject detection unit.

Further features of various embodiments will become apparent from the following description of exemplary embodiments with reference to the attached drawings.

BRIEF DESCRIPTION OF THE DRAWINGS

FIG. 9 is another flowchart of the correction processing of the line-of-sight detection position.

DESCRIPTION OF THE EMBODIMENTS

Example embodiments of the techniques in the present disclosure will be described below with reference to the drawings. Note that the dimensions, materials, shapes, and relative placements of components described below should be appropriately changed according to the configuration and various conditions of an apparatus to which the disclosure is applied. Therefore, the scope of the every embodiment is not intended to be limited to the following description. In particular, to configurations and steps which are not depicted or described, it is possible to apply a known technique or a publicly known technique of the corresponding technical field. In addition, there are cases where a duplicate description is omitted.

First Embodiment

A first embodiment of the technique in the present disclosure will be described below.

Description of Configuration

Figure 1A:
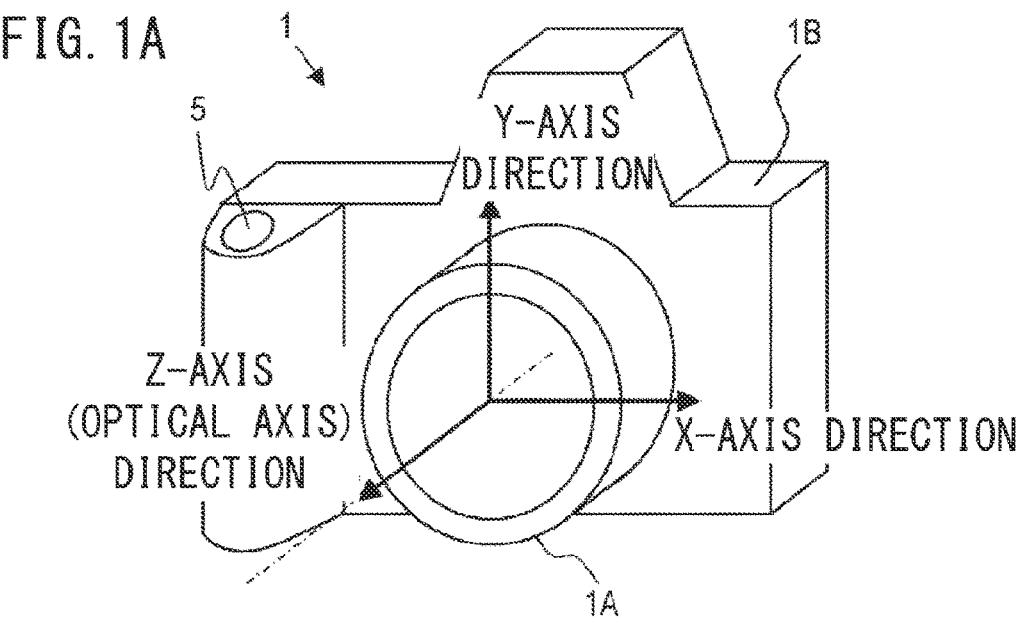
FIGS. 1A and 1B are external views of a camera.
Figure 1B:
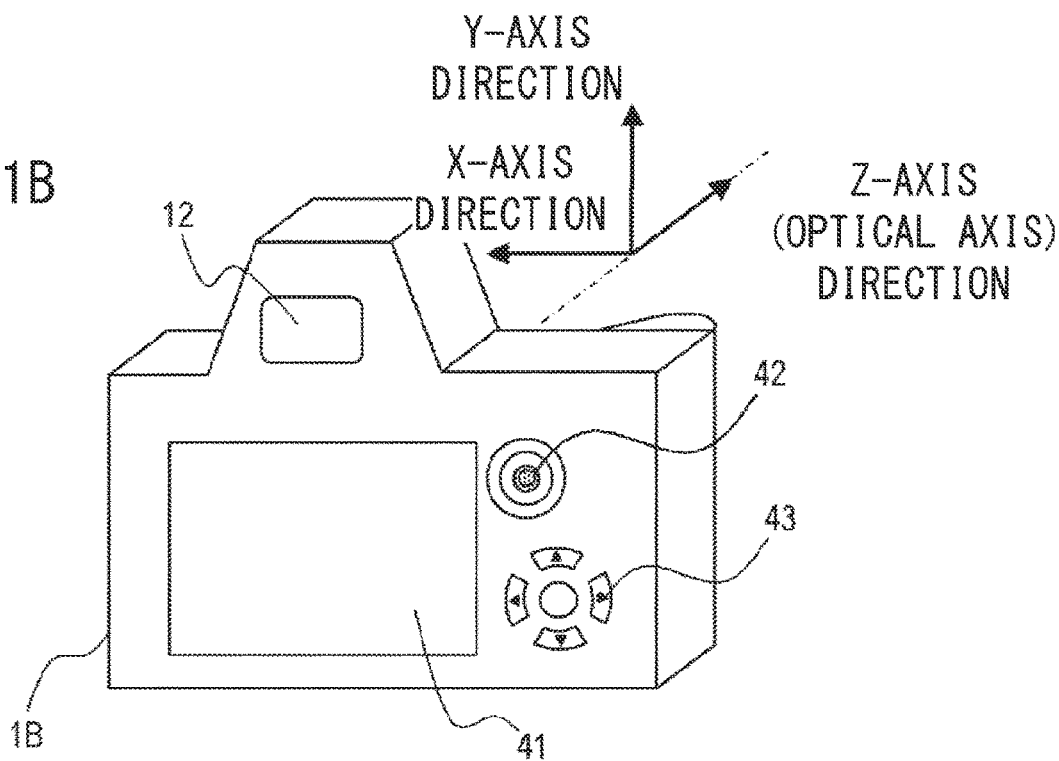

FIGS. 1A and 1B show the exterior of a camera 1 (digital still camera; interchangeable lens camera) according to the first embodiment. FIG. 1A is a front perspective view of the camera 1, and FIG. 1B is a rear perspective view of the camera 1. As shown in FIG. 1A, the camera 1 has a photographing lens unit 1A and a camera body unit 1B. In the camera body unit 1B, a release button 5 serving as an operation member which receives photographing operations from a user (photographer) is disposed. As shown in FIG. 1B, on the back of the camera body unit 1B, an eyepiece 12 (an eyepiece optical system) for the user to look into a display device 10 (electronic display viewfinder), described later, which is included in the camera body unit 1B is disposed. Note that the eyepiece optical system may include a plurality of lens. On the back of the camera body unit 1B, operation members 41 to 43, which receive various operations from the user, are also disposed. For example, the operation member 41 is a touch panel which receives a touch operation, the operation member 42 is an operation lever which can be tilted in each direction, and the operation member 43 is a four-direction key which can be pushed in in each of four directions. The operation member 41 (touch panel) includes a display panel, such as a liquid crystal panel, and has the function of displaying an image with the display panel.

Figure 2:
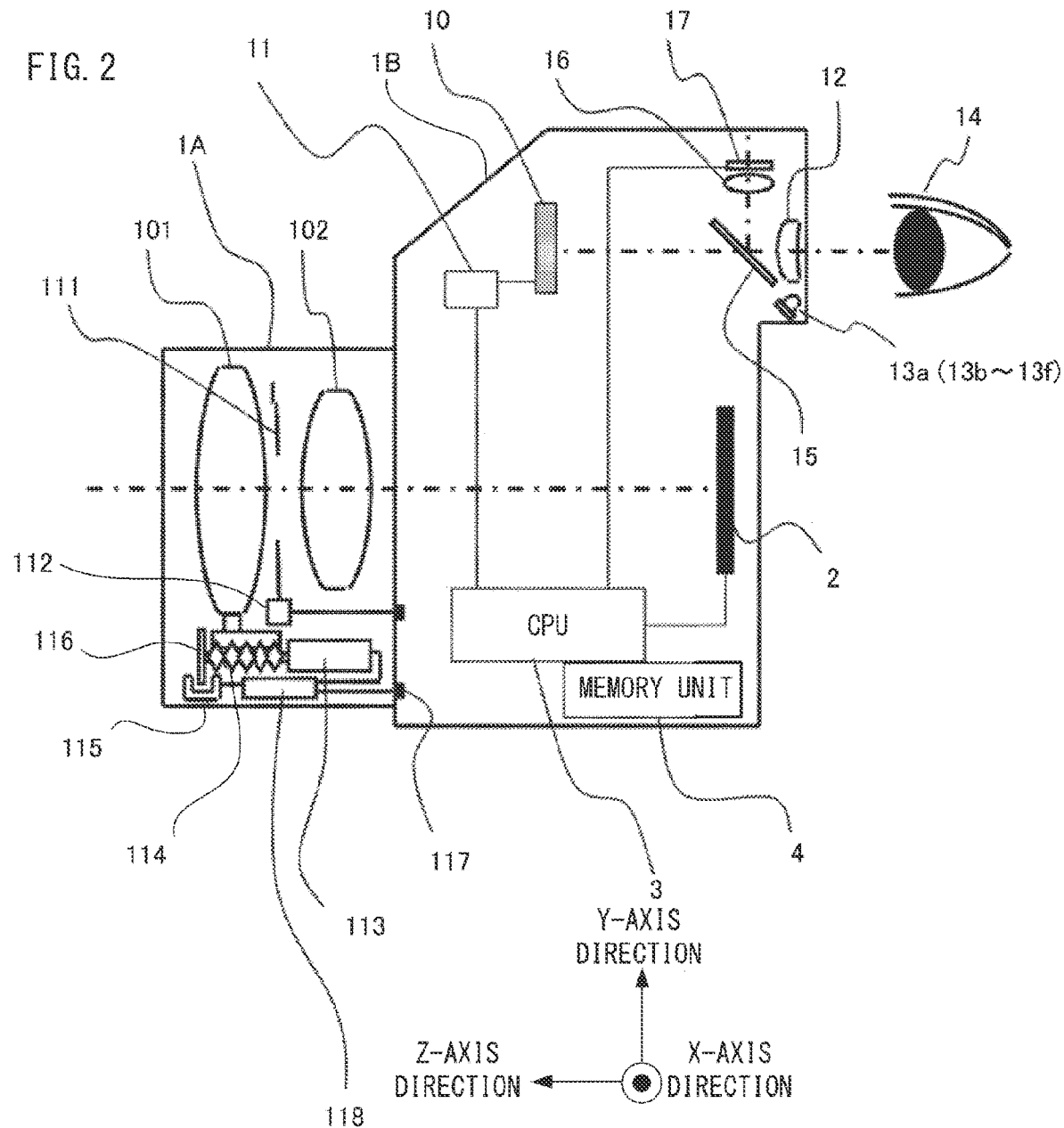
FIG. 2 is a cross-sectional view of the camera.

FIG. 2 is a cross-sectional view obtained by cutting the camera 1 with a YZ plane formed by a Y axis and a Z axis shown in FIG. 1A, and shows a schematic internal configuration of the camera 1.

As shown in FIG. 2, in the photographing lens unit 1A, two lenses 101 and 102, a diaphragm 111, a diaphragm drive section 112, a lens drive motor 113, and a lens drive member 114 are included. Further, in the photographing lens unit 1A, a photocoupler 115, a pulse plate 116, a mount contact 117, and a focusing circuit 118 are included. The lens drive member 114 is constituted by a drive gear and the like, and the photocoupler 115 detects rotation of the pulse plate 116, which moves in synchronization with the lens drive member 114, and transmits the rotation thereof to the focusing circuit 118. The focusing circuit 118 drives the lens drive motor 113 based on information from the photocoupler 115 and information from the camera body unit 1B (information on a lens drive amount) to move the lens 101 and change a focus position. The mount contact 117 is an interface between the photographing lens unit 1A and the camera body unit 1B. Note that two lenses 101 and 102 are shown for the sake of simplicity, but more than two lenses may be included in the photographing lens unit 1A.

In the camera body unit 1B, an imaging element 2, a CPU 3, a memory unit 4, a display device 10, and a display device drive circuit 11 are included. The imaging element 2 is disposed on a planned image plane of the photographing lens unit 1A. The CPU 3 is a central processing unit of a microcomputer, and controls the entire camera 1. The memory unit 4 stores an image captured by the imaging element 2 and the like. The display device 10 includes liquid crystal, and is display unit configured to display a captured image of a subject on a display surface of the display device 10. The display device drive circuit 11 drives the display device 10. The user can view an image (an image captured by the imaging element 2 or the like) displayed on the display surface of the display device 10 through the eyepiece 12.

In the camera body unit 1B, light sources 13a to 13f, an optical divider 15, a light receiving lens 16, and an eye imaging element 17 are included. The light sources 13a to 13f are light sources for illuminating an eyeball 14 of the user. The light sources 13a to 13f are conventionally used in a single-lens reflex camera or the like in order to detect a line-of-sight direction (a direction of a line of sight; a direction in which the user looks) from a relationship between a reflected image (corneal reflection image; Purkinje image) by corneal reflection of light and a pupil. Specifically, each of the light sources 13a to 13f is an infrared light emitting diode, which emits infrared light which is not sensed by the user, and the light sources 13a to 13f are disposed around the eyepiece 12. An optical image of the illuminated eyeball 14 (eyeball image; an image formed by reflected light which is emitted from the light sources 13a to 13f and reflected at the eyeball 14) passes through the eyepiece 12 and is reflected at the optical divider 15. Subsequently, the eyeball image is formed on the eye imaging element 17 in which rows of photoelectric elements, such as CCDs or CMOSs, are two-dimensionally disposed by the light receiving lens 16. The light receiving lens 16 positions the pupil of the eyeball 14 and the eye imaging element 17 such that the pupil of the eyeball 14 and the eye imaging element 17 have a conjugate image formation relationship. By a predetermined algorithm described later, the line-of-sight direction of the eyeball 14 is detected from the position of the corneal reflection image in the eyeball image formed on the eye imaging element 17.

Figure 3:
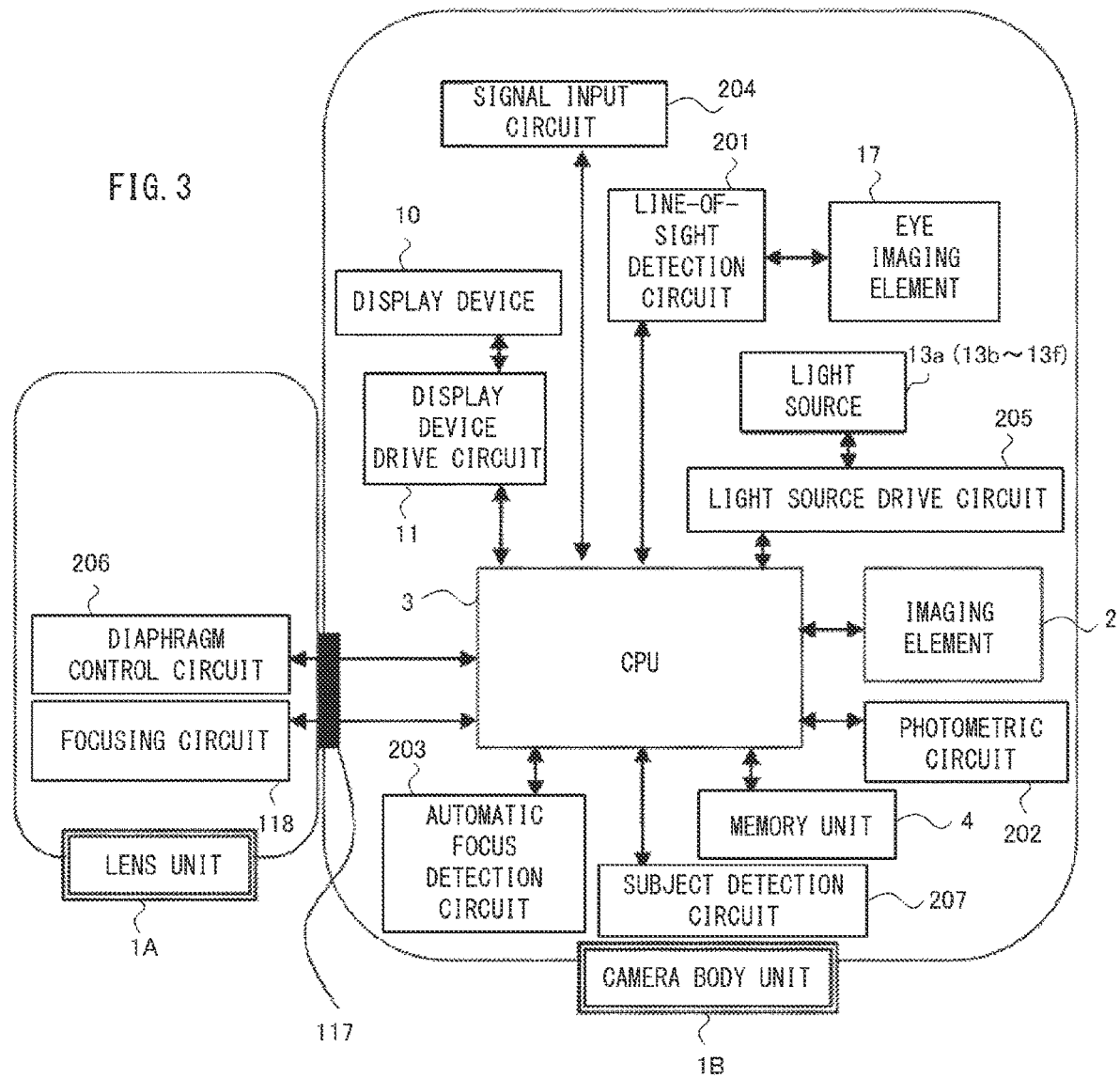
FIG. 3 is a block diagram of the camera.

FIG. 3 is a block diagram showing an electrical configuration in the camera 1. To the CPU 3, a line-of-sight detection circuit 201, a photometric circuit 202, an automatic focus detection circuit 203, a signal input circuit 204, a display device drive circuit 11, and a light source drive circuit 205 are connected. In addition, the CPU 3 transmits signals to the focusing circuit 118 disposed in the photographing lens unit 1A and a diaphragm control circuit 206 included in the diaphragm drive section 112 in the photographing lens unit 1A via the mount contact 117. The memory unit 4 connected to the CPU 3 has the function of storing an imaging signal from each of the imaging element 2 and the eye imaging element 17, and the function of storing a line-of-sight correction parameter which corrects an individual difference of the line of sight described later.

The line-of-sight detection circuit 201 performs A/D conversion on the output (an eye image in which an eye is imaged) of the eye imaging element 17 in a state in which the eyeball image is formed on the eye imaging element 17, and transmits the result of the A/D conversion to the CPU 3. The CPU 3 extracts a feature point required for line-of-sight detection from the eye image according to a predetermined algorithm described later, and calculates a viewpoint of the user (a line-of-sight position; a position to which the line of sight is directed; a position at which the user looks) on the display surface of the display device 10 from the position of the feature point. With this, the CPU 3 detects the line-of-sight position of the user with respect to the display device 10. Note that, in the subsequent description, the detected line-of-sight position is described as a line-of-sight detection position.

The photometric circuit 202 performs amplification, logarithmic compression, and A/D conversion on a signal obtained from the imaging element 2 also serving as a photometric sensor, specifically, a brightness signal corresponding to luminosity of a field, and sends the result to the CPU 3 as field brightness information.

The automatic focus detection circuit 203 performs A/D conversion on signal voltages from a plurality of detection elements (a plurality of pixels) used for phase difference detection which are included in the imaging element 2, and sends the signal voltages subjected to the A/D conversion to the CPU 3. The CPU 3 calculates a distance to a subject corresponding to each focus detection point from signals of the plurality of detection elements. This is a publicly known technique known as imaging surface phase difference AF. In the first embodiment, as an example, it is assumed that focus detection points are present at 180 positions in a field of view in the viewfinder (a field of view when the user looks into the viewfinder), specifically, 180 positions on the imaging surface corresponding to 180 positions shown on the display surface of the display device 10.

To the signal input circuit 204, a switch SW1 and a switch SW2 are connected. The switch SW1 is a switch which is turned ON with the first stroke of the release button 5, and is used for starting photometry, distance measurement, and line-of-sight detection operation of the camera 1. The switch SW2 is a switch which is turned ON with the second stroke of the release button 5, and is used for starting photographing operations. An ON signal from each of the switches SW1 and SW2 is input to the signal input circuit 204, and is transmitted to the CPU 3. A subject detection circuit 207 can perform detection of specific subjects, such as a person, an animal, and others, for imaging signals from the imaging element 2 and the eye imaging element 17 which are stored in the memory unit 4.

Figure 4:
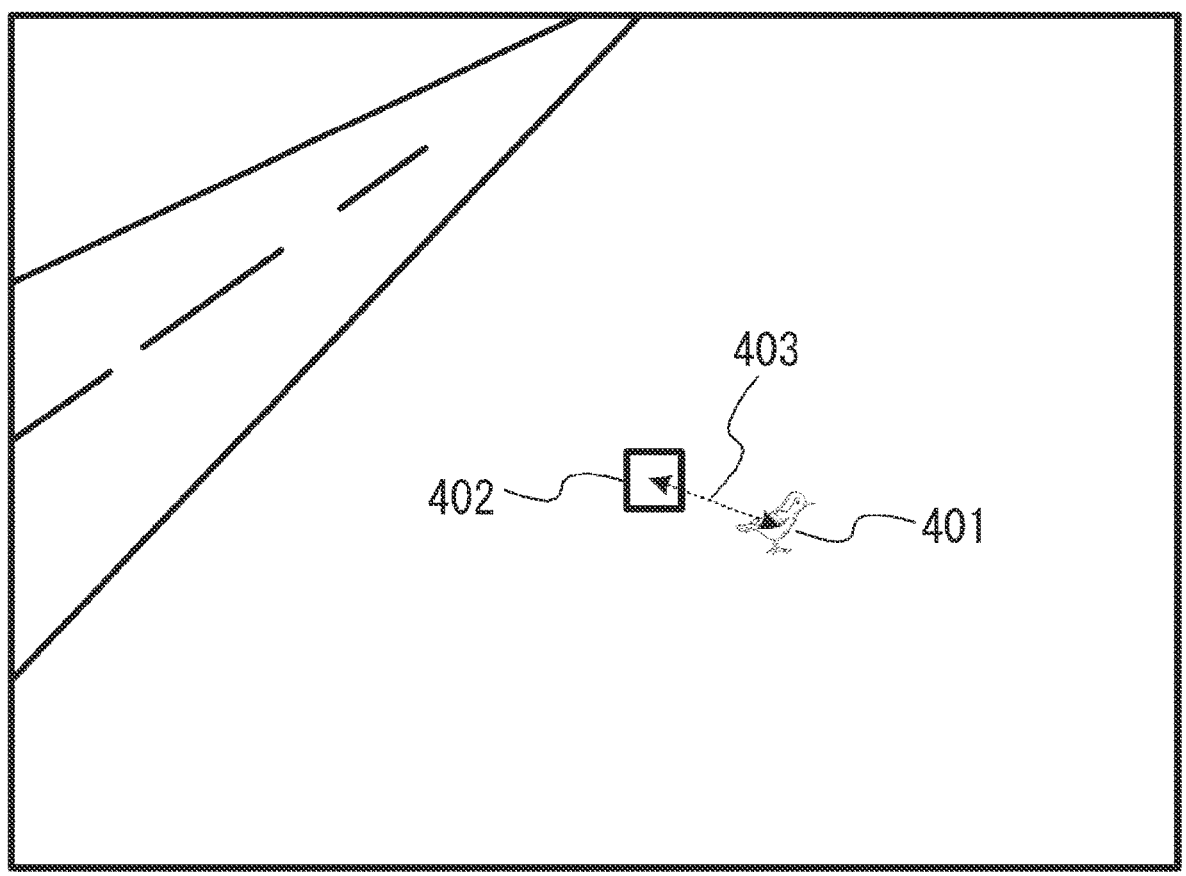
FIG. 4 is a view showing a display image of the camera.

FIG. 4 is a view for explaining an offset which is a difference between (i) a position at which the user looks into the viewfinder and actually watches a subject present in an angle of view and (ii) the line-of-sight detection position detected by the CPU 3. While the user watches a subject 401 in the angle of view, the line-of-sight detection circuit 201 detects a line-of-sight detection position 402 indicated by a solid-line frame as the line-of-sight position of the user due to a detection error. At this point, a position offset 403 serves as an offset between the position which the user actually watches and the detection position. An object of the present embodiment is to automatically detect and correct the offset. In addition, in offset correction, the position of the subject detected from an image by the subject detection circuit 207 is used.

Figure 5A:
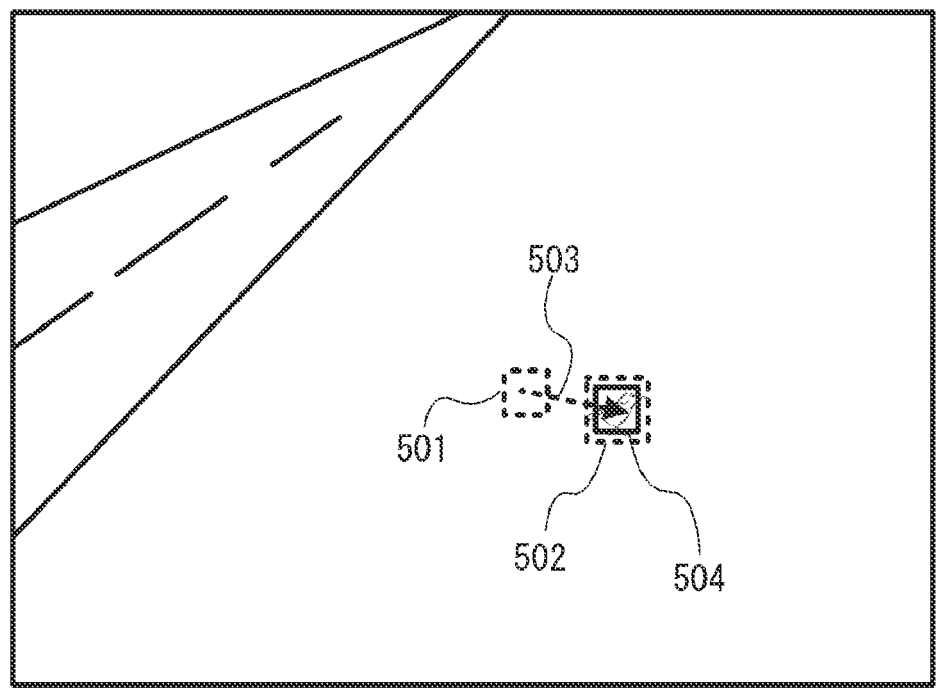
FIGS. 5A and 5B are views for explaining a correction method of a line-of-sight detection position.
Figure 5B:
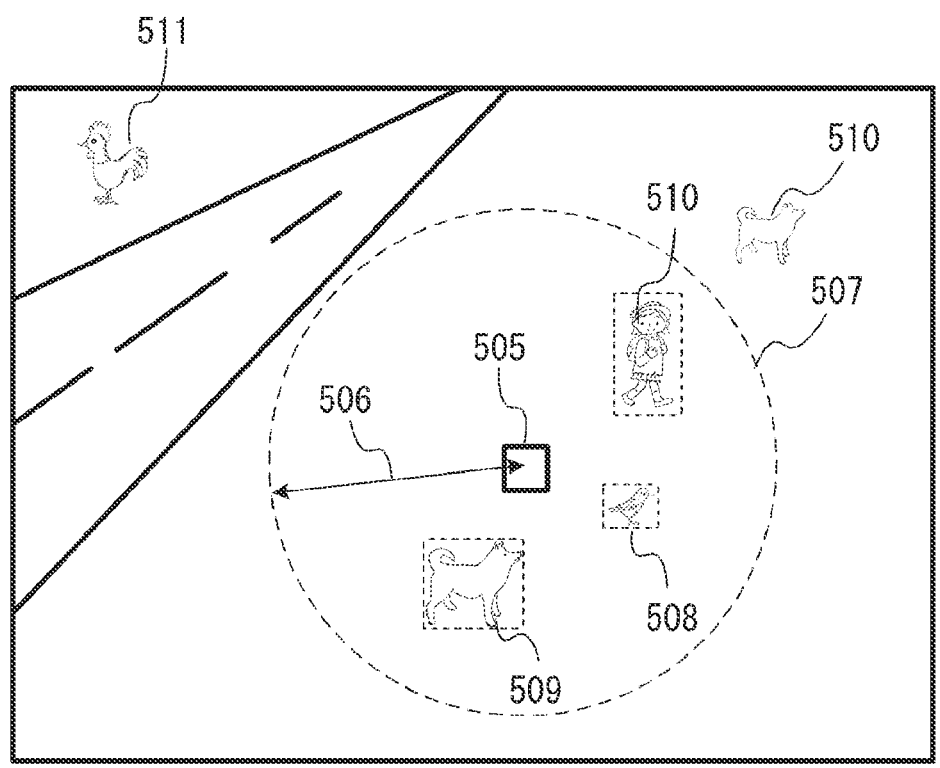

FIG. 5A is a view for explaining a correction method of the line-of-sight detection position after a detected subject, used in the case where the offset correction is performed in the present embodiment, is determined. In addition, FIG. 5B is a view for explaining a method for determining which detected subject is to be used in the correction in the case where a plurality of candidates for the detected subject, used when the offset correction is performed, are present.

Herein, with reference to FIG. 5A, FIG. 5B, and a flowchart in FIG. 6, processing executed by the CPU 3 of the camera 1 in the present embodiment will be described. Note that, in the following processing, the CPU 3 implements functions of a line-of-sight detection unit, a subject detection unit, and a correction value determination unit by controlling operations of the individual components, such as the individual circuits, in the camera 1. It is assumed that, in the display device 10, marks by dotted lines indicating a line-of-sight detection position 501 and a subject detection position 502, an arrow indicating an offset 503, and a solid line indicating a line-of-sight detection position 504 after correction, which are shown in FIG. 5A as examples, are not displayed. Similarly, it is assumed that, in the display device 10, marks by a dotted line of an area surrounding each of the subjects 508 to 510, an arrow indicating a maximum offset radius 506, and a dotted-line circle indicating a maximum offset area 507, which are shown in FIG. 5B as examples, are not displayed. Note that the display device 10 may be configured so as to display at least one or more of the marks mentioned above.

In Step S601, the CPU 3 determines a degree of matching between the line-of-sight detection position of the user with respect to the display device 10 and the position of the detected subject present in a captured image detected by the subject detection circuit 207. Note that, in the case where the line-of-sight detection position is corrected by the following processing, the processing in the present step is executed on the line-of-sight detection position after correction. In the determination of the degree of matching, the degree of matching indicative of the level of matching between the line-of-sight detection position and the position of the detected subject in a predetermined time period is calculated, and the calculated degree of matching is compared with a threshold value. Herein, an example of the degree of matching between the line-of-sight detection position and the position of the detected subject includes a distance between the center of an area indicative of the line-of-sight detection position and the center of an area indicative of the position of the detected subject. In this case, the degree of matching is increased as the distance is reduced. Note that, with regard to the degree of matching, any calculation method and calculation result may be adopted as long as the calculation method can calculate the degree of approximation between the line-of-sight detection position and the position of the detected subject by using a known technique. In addition, herein, in the case where a plurality of candidates for the detected subject are present in an image, it is assumed that it is only required that the degree of matching between the position of any one of the detected subjects and the line-of-sight detection position is calculated. As an example, the CPU 3 selects the position of the detected subject that minimizes a distance from the line-of-sight detection position in the image, and calculates the degree of matching. In the case where the calculated degree of matching is more than the threshold value (S601: NO), the CPU 3 advances the processing to Step S609. In addition, in the case where the calculated degree of matching is not more than threshold value (S601: YES), the CPU 3 advances the processing to Step S602.

In Step S602, the CPU 3 determines, from the detected subjects detected by the subject detection circuit 207, the detected subject present in an area that is determined with respect to the line-of-sight detection position detected by the line-of-sight detection circuit 201. As shown in FIG. 5B, the line-of-sight detection position of the user detected by the line-of-sight detection circuit 201 before the correction value of the line-of-sight detection position described later is updated is a line-of-sight detection position 505 before correction. An area in a circle having the predetermined maximum offset radius 506 as a radius from the center of the line-of-sight detection position 505 before correction is the maximum offset area 507. The CPU 3 determines whether or not the detected subject detected by the subject detection circuit 207 is present in the maximum offset area 507. Note that the maximum offset area is an example of a predetermined area in the image.

The maximum offset radius 506 is determined in advance based on information related to the maximum offset generated by the line-of-sight detection circuit 201. It is possible to calculate the maximum offset radius (e.g., by a function for calculating the proper maximum offset radius) based on statistics related to a distance between the line-of-sight detection position that is detected previously by the line-of-sight detection circuit 201 and the position of the detected subject which the user watches. In the present embodiment, it is assumed that three subjects 508 to 510 are present in the maximum offset area 507 as the detected subjects. The subject 508 is a bird, the subject 509 is a dog, and the subject 510 is a person. A subject 510 which is a dog and a subject 511 which is a bird which are present in the angle of view are subjects positioned outside the maximum offset area 507, and hence they are excluded from the detected subject. In addition, the CPU 3 excludes, from the detected subject in the maximum offset area 507, any detected subject that is associated with attribute information indicating that the detected subject has been used in the calculation of the offset. Note that the attribute information is information which is associated with each subject in Step S605, which is described later. With this, even when the correction value is updated in Step S607, which is described later, in the case where the degree of matching is not more than the threshold value in Step S601 (i.e., in the case where a wrong detected subject is determined), the same wrongly detected subject is prevented from being determined again in Step S602.

Next, in Step S603, the CPU 3 determines whether or not one or more detected subjects (the detected subjects determined in Step S602) detected by the subject detection circuit 207 are present in the maximum offset area 507. In the case where no detected subject is present in the maximum offset area 507 (S603: N), the CPU 3 ends the processing. In the case where one or more detected subjects are present in the maximum offset area 507 (S603: Y), the CPU 3 advances the processing to Step S604.

In Step S604, the CPU 3 determines, from a plurality of the detected subjects present in the maximum offset area 507, the subject serving as a candidate for the line-of-sight position based on a photographing mode used in photographing and the distance between the line-of-sight detection position and the detected subject. Herein, the photographing mode is a mode in which photographing is performed, and the user operates the camera 1 to make a selection and the photographing mode corresponding to the subject (various parameters corresponding to the subject) is thereby set. Examples of the photographing mode include a photographing mode for photographing a person, and a photographing mode for photographing a bird. Note that information indicative of the photographing mode can be said to be information indicating, among types (a person and a bird) of the detected subject, which type of the subject is prioritized. For example, in the case of the photographing mode for photographing a person, among a plurality of detected subjects, a subject corresponding to a person is preferentially determined to be the detected subject. In examples shown in FIGS. 5A and 5B, it is assumed that the photographing mode for photographing a bird is selected by the user. The CPU 3 comprehensively determines the selected photographing mode and the detected subject closest to the line-of-sight detection position to select the subject 508 as the subject serving as the candidate for the line-of-sight position.

Next, in Step S605, the CPU 3 associates the subject 508 selected as the subject serving as the candidate for the line-of-sight position with the attribute information indicating that the subject 508 has been used in the processing for calculating the offset. The CPU 3 stores the attribute information in the memory unit 4.

Next, in Step S606, the CPU 3 calculates the offset, which is an error of line-of-sight detection, from a difference between the line-of-sight detection position detected by the line-of-sight detection circuit 201 and the position of the subject serving as the candidate for the line-of-sight position selected in Step S604. The details of the processing will be described with reference to FIG. 5A.

As shown in FIG. 5A, there are the line-of-sight detection position 501 before correction indicated by the dotted-line frame and the subject detection position 502 indicated by the dotted-line frame, and a positional difference between the line-of-sight detection position 501 before correction and the subject detection position 502 is the offset 503. In addition, the subject detection position 502 corresponds to the position of the subject 508 in FIG. 5B. As an example, the CPU 3 calculates, as the offset, the distance between the center of the area of the dotted-line frame of the line-of-sight detection position 501 and the center of the area of the dotted-line frame of the subject detection position 502.

Next, in Step S607, the CPU 3 determines the correction value used when the line-of-sight detection circuit 201 detects the line-of-sight detection position of the user of the camera 1 by using the offset 503 calculated in Step S606, and updates the existing correction value.

The correction value is updated in Step S607, whereby the CPU 3 corrects the line-of-sight detection position 501 which is detected by the line-of-sight detection circuit 201 before correction using the offset to a new position 504 (line-of-sight detection position after correction) with the updated correction value. In the example in FIG. 5A, the line-of-sight detection position 501 before correction indicated by the dotted-line frame is changed to the line-of-sight detection position 504 after correction indicate by the solid-line frame. As a result, the line-of-sight detection position 504 after correction matches the subject detection position 502, and the line-of-sight detection position 504 after correction is displayed as the line-of-sight detection position in the display device 10.

Next, when the processing in Step S607 is completed, the CPU 3 advances the processing to Step S608. In Step S608, the CPU 3 determines whether or not a predetermined time period has elapsed. At the point of time when the predetermined time period has elapsed (S608: Y), the CPU 3 returns the processing to Step S601, and executes the processing in Step S601 again. By returning the processing to Step S601 from Step S607 after the lapse of the predetermined time period, in the example in FIG. 5B, in the case where a subject which the user watches is not the subject 508, there are cases where the degree of matching is not more than the threshold value in S601. The reason why the degree of matching is not more than the threshold value is, for example, because the line-of-sight detection position does not follow the subject 508. Subsequently, in Step S602, the CPU 3 refers to the attribute information associated in Step S605 and excludes the subject 508 from the detected subject, and then repeats the above processing on other detected subjects to update the correction value to a new correction value. Herein, as the predetermined time period used in the determination in Step S608, it is possible to adopt, for example, a time period in which a typical user continuously watches the subject.

According to the present embodiment, an error which is displacement between the line-of-sight detection position and the watch position is calculated for each user based on a difference between the line-of-sight detection position and the subject position in the circle having the maximum offset radius in the image without manual correction of the line-of-sight detection position by the user. Subsequently, by using the calculated error, it is possible to automatically correct the error between the line-of-sight detection position and the position which the user actually watches. Note that the error may have an individual difference and, in this case, the CPU 3 may store the correction value calculated by the above processing for each user in the memory unit 4.

Second Embodiment

Next, a second embodiment in the present disclosure will be described with reference to the drawings. Note that, in the following description, the same components as those in the first embodiment are designated by the same reference numerals, and the detailed description thereof will be omitted.

Figure 7:
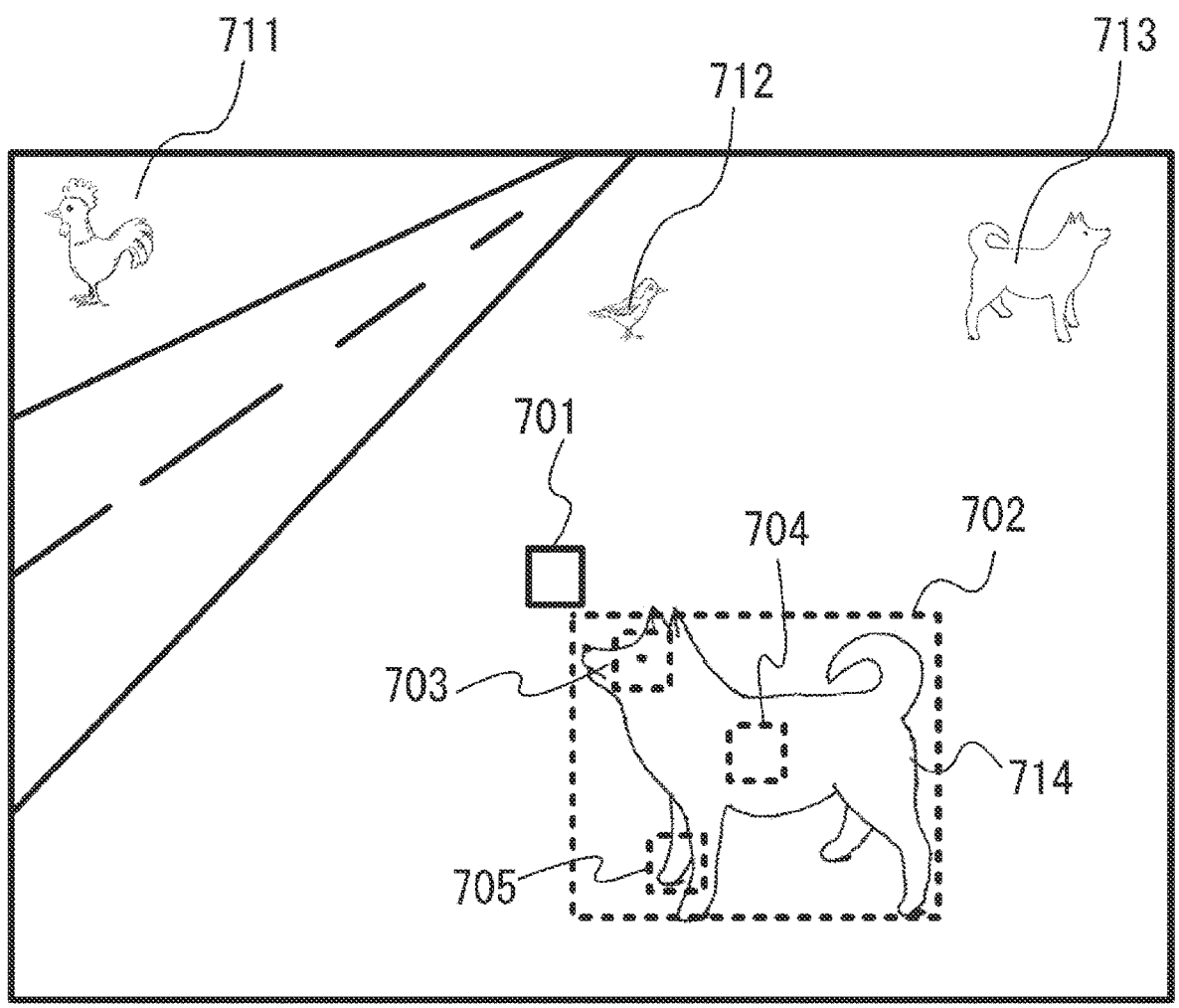
FIG. 7 is a view for explaining a calculation method of a correction value of the line-of-sight detection position.

FIG. 7 is a view schematically showing the calculation of the correction value used when the line-of-sight detection circuit 201 in the present embodiment detects the line-of-sight detection position of the user of the camera 1. In an example shown in FIG. 7, it is assumed that, as subjects present in the image displayed by the display device 10, there are birds 711 and 712 and dogs 713 and 714, and the user watches the dog 714. In FIG. 7, an area in which the detected subject (dog 714), which is detected by the subject detection circuit 207 and is indicated by a subject detection frame 702, is larger than a predetermined size. Herein, the predetermined size of the subject in the angle of view may be determined appropriately. In this case, even when it is intended that the offset is determined based on a difference between a line-of-sight detection position 701 before correction and the position of the detected subject, the camera 1 cannot determine a portion of the subject 714 in the subject detection frame 702 which the user watches, and hence it is not possible to determine the offset. For example, the watch position by the user may be different positions, such as a line-of-sight candidate position 703 which corresponds to an eye part of the dog serving as the subject 714, a line-of-sight candidate position 704 which corresponds to the center of the body of the dog, and a line-of-sight candidate position 705 which corresponds to a foreleg portion of the dog, depending on the character of the user and a situation during photographing. To cope with this, in the present embodiment, the CPU 3 executes the following processing, whereby it is possible to determine the portion of the subject 714 which the user watches with high accuracy and properly update the correction value of the line-of-sight detection position.

Herein, processing executed by the CPU 3 of the camera 1 in the present embodiment will be described with reference to FIGS. 8A to 8D and a flowchart in FIG. 9. Note that, in FIGS. 8A to 8D, subjects 811 to 813 are omitted for descriptive convenience.

In Step S901, the degree of matching between (i) the line-of-sight detection position detected by the line-of-sight detection circuit 201 and (ii) the position of the detected subject which is detected by the subject detection circuit 207 and is present in a captured image or a line-of-sight candidate position is determined. The details of the line-of-sight candidate position will be described later with reference to FIGS. 10A and 10B.

Figure 6:
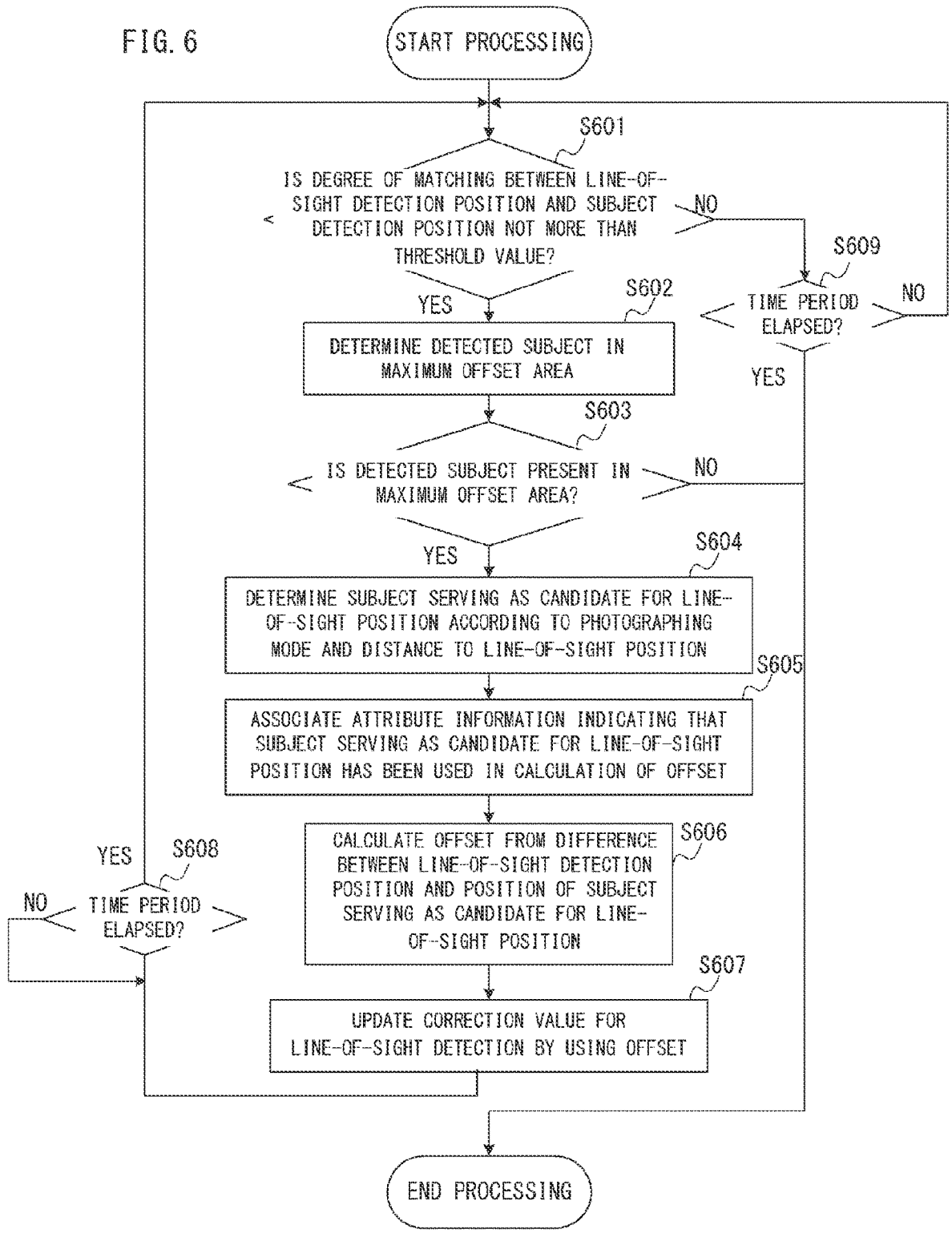
FIG. 6 is a flowchart of correction processing of the line-of-sight detection position.

The processing in Steps S902 to S905 is the same as that in Steps S602 to S605 in the flowchart in FIG. 6, and hence the detailed description thereof will be omitted. Next, in Step S910, the CPU 3 determines whether the size of the subject serving as the candidate for the line-of-sight position less than a predetermined threshold value. Herein, as an example, the size of the subject is assumed to be the size of the subject detection frame of the subject in the angle of view, which is determined by using a known technique. In the example shown in FIG. 7, in the case where the size of the subject detection frame 702 is not less than a specific threshold value, it is assumed that it is inappropriate to narrow the watch position of the subject of the user to one position. In the case where the CPU 3 determines that the size of the subject is not less than the threshold value (S910: YES), the CPU 3 advances the processing to Step S911. In addition, in the case where the CPU 3 determines that the size of the subject is less than a predetermined threshold value (S910: NO), the CPU 3 advances the processing to Step S906. In the case where the CPU 3 advances the processing to Step S906, the CPU 3 performs the same processing as that in the first embodiment in Step S606. Processing in Steps S907, S908, and S909 is the same as that in Steps S607, S608, and S609 in FIG. 6, and hence the description of details of the processing will be omitted.

Figures 10A, 10B:
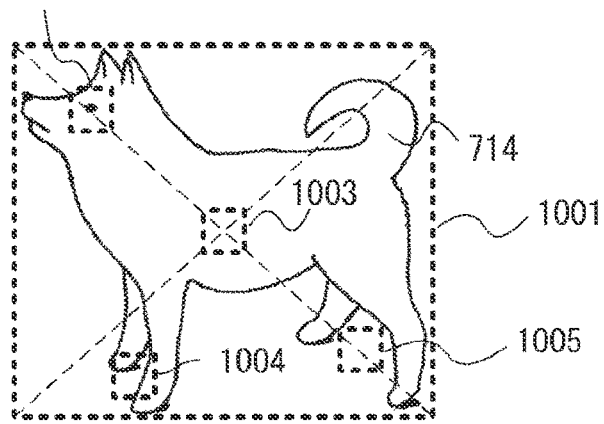
FIGS. 10A and 10B are views for explaining a line-of-sight candidate position table and a line-of-sight candidate position.

In Step S911, the position of a line-of-sight candidate in the subjects serving as the candidates for the line-of-sight position is selected according to a line-of-sight candidate position table. Herein, with reference to FIGS. 10A and 10B, the position of the line-of-sight candidate and the line-of-sight candidate position table will be described. FIG. 10A is an example of the line-of-sight candidate position table, and FIG. 10B shows the specific position of the line-of-sight candidate in the subject. Note that it is assumed that, as an example, data of the line-of-sight candidate position table is stored in the memory unit 4 of the camera 1. The CPU 3 refers to the line-of-sight candidate position table stored in the memory unit 4 to execute the processing in Step S911.

In FIG. 10B, a subject detection frame 1001 is a rectangular frame which surrounds the entire subject 714 detected by the subject detection circuit 207. Each of an eye part detection position 1002, a gravity center position 1003, a foreleg position 1004, and a hind leg position 1005 may be a position serving as a candidate for the line-of-sight position which is present in the subject detection frame 1001 and which the user may watch. Note that each of the eye part detection position 1002, the gravity center position 1003, the foreleg position 1004, and the hind leg position 1005 is an example of a feature position of the detected subject. In addition, the position serving as the candidate for the line-of-sight position may be appropriately set according to the type of the detected subject. As the type of the subject, it is possible to adopt a category which classifies the subjects, such as an animal, a person, a vehicle, a plant, or a structure.

The eye part detection position 1002 is detected by organ detection processing by the subject detection circuit 207 in the case where the subject is a living thing, such as an animal or a person. The gravity center position 1003 is detected as a geometric gravity center position of the subject detection frame 1001 by the subject detection circuit 207. Note that, while the subject detection frame 1001 is an example of the subject area and the subject detection frame 1001 is a rectangular area which surrounds the subject, the subject detection frame 1001 may be an area which surrounds part of the subject instead of the entire subject, and the shape of the subject detection frame 1001 is not limited to the rectangular shape and the subject detection frame 1001 may have any shape. In addition, the candidate for the detection position is not limited to the gravity center position of the subject detection frame 1001, and a position which can be determined according to the shape of the subject detection frame 1001 may be used as the candidate for the detection position. The foreleg position 1004 and the hind leg position 1005 are detected by the organ detection processing by the subject detection circuit 207 and specific processing of a positional relationship between the foreleg position 1004 and the hind leg position 1005 in the subject detection frame 1001. Note that the organ detection processing by the subject detection circuit 207, the detection processing of the geometric gravity center position of the subject detection frame, and the specific processing of the positional relationship between the foreleg position 1004 and the hind leg position 1005 are implemented by using a known technique, and hence the description of details of the processing will be omitted.

As shown in FIG. 10A, in the line-of-sight candidate position table, the priority of the candidate for the detection position is set for each of four line-of-sight positions, including the eye part detection position 1002, the gravity center position 1003, the foreleg position 1004, and the hind leg position 1005, which are detected by the subject detection circuit 207 for the subject 714. An example shown in FIG. 10A shows that the priority level of the candidate for the detection position is higher as the value of the priority is smaller. Consequently, according to the line-of-sight candidate position table in FIG. 10A, the priority levels (priorities) are progressively lower in the order of the eye part position, the gravity center position, the foreleg position, and the hind leg position of the subject 714. Accordingly, the CPU 3 refers to the line-of-sight candidate position table, and updates the correction value for line-of-sight detection by using the eye part position of the subject 714 as the candidate for the line-of-sight position of the user first.

Processing in the following steps will be described with reference to FIGS. 8A to 8D. It is assumed that the user watches the eye part of the subject 714 in FIG. 8A, and it is assumed that the user watches the gravity center position of the subject 714 in FIG. 8B. First, processing executed by the CPU 3 in the case of FIG. 8A will be described.

Figure 8A:
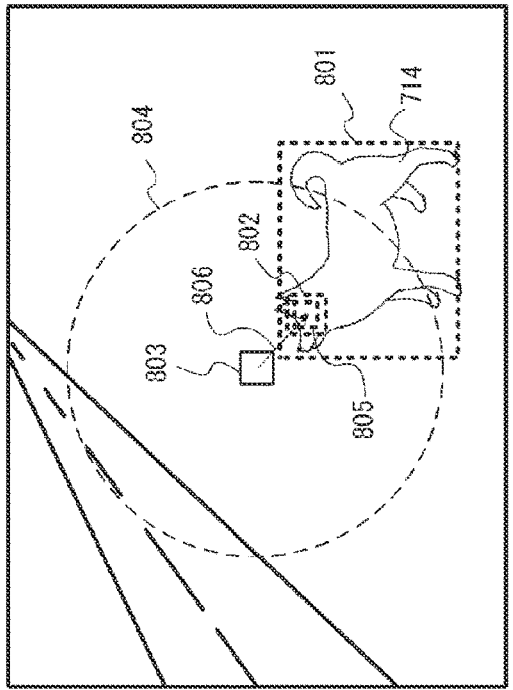
FIGS. 8A to 8D are views for explaining a determination method of a degree of matching of the line-of-sight detection position after correction.

In the case of FIG. 8A, the detected subject 714 is surrounded by a subject detection frame 801. In addition, it is assumed that the user watches a watch position 802 indicated by the dotted-line frame which corresponds to the eye part of the subject 714. The line-of-sight detection position before correction detected by the line-of-sight detection circuit 201 is a line-of-sight detection position 803 before correction indicated by the solid-line frame. Further, the eye part of the subject 714 is in a maximum offset area 804, which is an area in a circle having the line-of-sight detection position 803 before correction at the center, and the eye part has the highest priority in the line-of-sight position candidate table in FIG. 10A (priority=1).

Accordingly, in Step S911, the CPU 3 refers to the line-of-sight candidate position table and selects an eye part detection position 805 of the subject 714 detected by the subject detection circuit 207 as the line-of-sight candidate position used in correction processing of the line-of-sight detection position 803. Subsequently, in Step S912, the CPU 3 calculates an offset 806 from a difference between the line-of-sight detection position 803 before correction and the position of the eye part detection position 805.

Next, in Step S913, the CPU 3 updates the correction value for line-of-sight detection of the line-of-sight detection circuit 201 by using the offset 806 calculated in Step S911. As a result, in the camera 1, the position obtained by correcting the line-of-sight detection position detected by the line-of-sight detection circuit 201 with the offset 806 serves as the line-of-sight detection position after correction.

Next, in Step S914, the CPU 3 determines whether or not the predetermined time period has elapsed. The CPU 3 advances the processing to Step S915 at the point of time when the predetermined time period has elapsed (S914: YES).

Next, in Step S915, the CPU 3 determines the degree of matching between the line-of-sight detection position corrected by using the correction value updated in Step S913 and the line-of-sight candidate position 805. The determination is processing for determining the level of matching between the line-of-sight detection position after correction and the line-of-sight candidate position in a predetermined time period. Note that the matching between the positions includes not only the case where the positions completely match each other but also the case where, strictly speaking, the positions are apart from each other, but the positions are closely analogous to each other and can be considered to match each other.

Figure 8B:
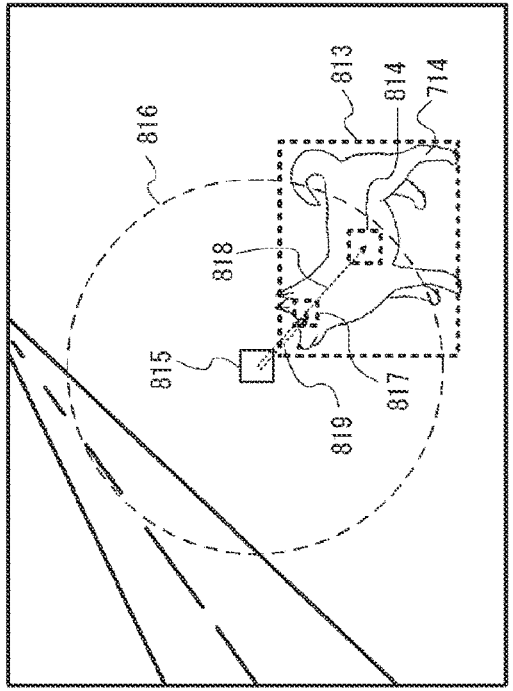
Figure 8C:
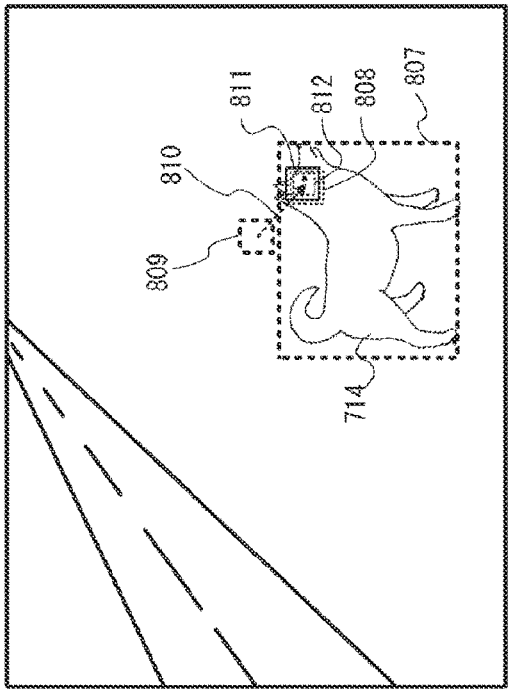

The details of the processing will be described with reference to FIG. 8C. FIG. 8C shows an example of a state in which the dog serving as the subject 714 shown in FIG. 8A moves, the orientation thereof is flipped horizontally, and the posture thereof is changed. In the present embodiment, in the case where the state of the subject is changed, the validity of the correction value updated in Step S913 is determined based on the degree of matching between the line-of-sight detection position after correction and the line-of-sight candidate position in each state.

An example shown in FIG. 8C shows the case where the user watches the eye part of the subject 714, and the detected subject 714 is surrounded by a rectangular subject detection frame 807. In addition, the user watches a watch position 808 indicated by the dotted-line frame corresponding to the eye part of the subject 714 continuously from the state in FIG. 8A. The line-of-sight detection position detected by the line-of-sight detection circuit 201 is a line-of-sight detection position 809 indicated by the dotted-line frame. In addition, the position to which an offset 810 (identical to the offset 806 in FIG. 8A) is applied by using the correction value updated in Step S913 is a line-of-sight detection position 811 after correction which is indicated by the solid-line frame.

In addition, in the example in FIG. 8C, the line-of-sight candidate position is an eye part detection position 812 detected by the subject detection circuit 207. Consequently, even when the state of the subject 714 is changed from the state of the subject 714 in FIG. 8A to the state of the subject 714 in FIG. 8C, the watch position 808 which the user watches, the line-of-sight detection position 811 after correction, and the eye part detection position 812 match each other. In Step S915, the CPU 3 calculates the degree of matching between the line-of-sight detection position 811 after correction and the eye part detection position 812. As an example, the CPU 3 calculates the degree of matching based on the distance between the center of the area of the line-of-sight detection position 811 indicated by the dotted-line frame and the center of the area of the eye part detection position 812 indicated by the dotted-line frame. In this case, the CPU 3 calculates the degree of matching such that the degree of matching is increased as the distance between the center of the area of the line-of-sight detection position 811 and the center of the area of the eye part detection position 812 is reduced. Note that the degree of matching is a degree indicating the level of matching between two positions and can be calculated by using a known technique, and hence the detailed description of the calculation of the degree of matching will be omitted.

Next, in Step S916, the CPU 3 determines whether or not the degree of matching calculated in Step S914 is not less than the predetermined threshold value. The CPU 3 ends the processing in the flowchart in FIG. 9 in the case where the degree of matching is not less than the predetermined threshold value (S916: YES), and the CPU 3 advances the processing to Step S917 in the case where the degree of matching is less than the predetermined threshold value (S916: NO). In the example shown in FIG. 8C, the degree of matching is not less than the threshold value, and the CPU 3 ends the processing in the flowchart in FIG. 9.

Next, processing executed by the CPU 3 in the case of FIG. 8B will be described. In the case of FIG. 8B, the detected subject 714 is surrounded by a subject detection frame 813. In addition, it is assumed that the user watches a watch position 814 indicated by the dotted-line frame corresponding to the gravity center position of the subject 714. The line-of-sight detection position before correction detected by the line-of-sight detection circuit 201 is a line-of-sight detection position 815 before correction indicated by the solid-line frame.

The gravity center position of the subject 714 is in a maximum offset area 816, which is an area in a circle having the line-of-sight detection position 815 before correction at the center. In addition, the eye part (priority=1) having the priority higher than that of the gravity center position (priority=2) in the line-of-sight position candidate table in FIG. 10A is also in the area 816. Consequently, in Step S911, the CPU 3 refers to the line-of-sight candidate position table and selects an eye part detection position 817 of the subject 714 detected by the subject detection circuit 207 as the line-of-sight candidate position which is used in the correction processing of the line-of-sight detection position 815.

Next, in Step S912, the CPU 3 calculates an offset 819 from a difference between the line-of-sight detection position 815 before correction and the position of the eye part detection position 817. Next, in Step S913, the CPU 3 updates the correction value for line-of-sight detection of the line-of-sight detection circuit 201 by using the offset 819 calculated in Step S911. As a result, in the camera 1, the position obtained by correcting the line-of-sight detection position detected by the line-of-sight detection circuit 201 with the offset 819 serves as the line-of-sight detection position after correction.

Next, in Step S914, the CPU 3 determines whether or not the predetermined time period has elapsed. The CPU 3 advances the processing to Step S915 at the point of time when the predetermined time period has elapsed (S914: YES).

Subsequently, in Step S915, the CPU 3 calculates the degree of matching between the line-of-sight detection position which is corrected by using the correction value updated in Step S913 and the line-of-sight candidate position 817 and, in Step S916, the CPU 3 determines the calculated degree of matching with the threshold value.

In the case of FIG. 8B, the position which the user watches is the watch position 814 corresponding to the gravity center position of the subject 714. Consequently, the offset to be adopted in the correction processing is an offset 818 corresponding to a difference between the line-of-sight detection position 815 before correction and the position of the line-of-sight candidate position 814 corresponding to the gravity center position. However, the CPU 3 selects the eye part of the subject 714 as the line-of-sight candidate position 817 according to the priority of the line-of-sight candidate position table, and hence the CPU 3 updates the correction value based on not the offset 818 but the offset 819.

Figure 8D:
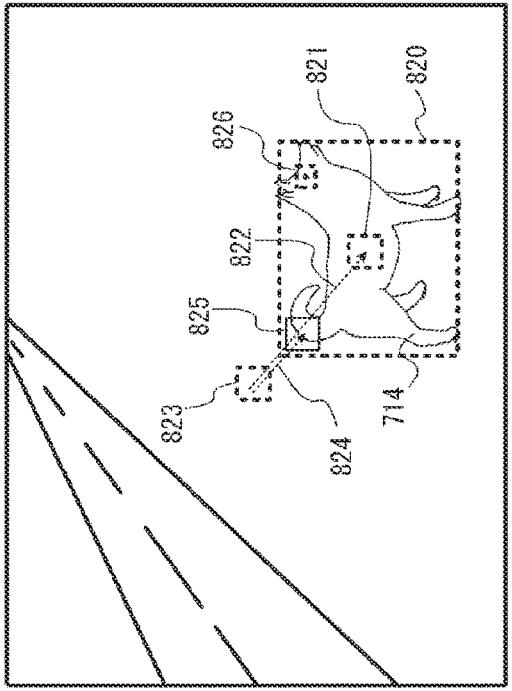

FIG. 8D shows an example of a state in which the dog serving as the subject 714 shown in FIG. 8B moves, the orientation thereof is flipped horizontally, and the posture thereof is changed. The example shown in FIG. 8D shows the case where the user watches the gravity center position of the subject 714, and the detected subject 714 is surrounded by a rectangular subject detection frame 820. In addition, the user watches a watch position 821 indicated by the dotted-line frame corresponding to the gravity center position of the subject 714 continuously from the state in FIG. 8B. Further, the line-of-sight detection position detected by the line-of-sight detection circuit 201 is a line-of-sight detection position 823 indicated by the dotted-line frame. However, the position to which an offset 824 (identical to the offset 819 in FIG. 8B) is applied by using the correction value updated in Step S913 is a line-of-sight detection position 825 after correction which is indicated by the solid-line frame.

At this point, the line-of-sight position candidate is an eye part detection position 826 detected by the subject detection circuit 207. Consequently, when the state of the subject 714 is changed from the state of the subject 714 in FIG. 8B to the state of the subject 714 in FIG. 8D, the watch position 821 which the user watches, the line-of-sight detection position 825 after correction, and the eye part detection position 826 don't match each other. Consequently, in Step S915, the CPU 3 calculates the degree of matching between the line-of-sight detection position 825 after correction and the eye part detection position 826 and, in Step S916, the CPU 3 determines that the degree of matching is less than the predetermined threshold value (S916: NO).

As a result, the CPU 3 advances the processing to Step S917 from Step S916. In Step S917, the CPU 3 refers to the line-of-sight candidate position table, and the CPU 3 determines whether or not an unused position serving as the line-of-sight candidate which is not selected in Step S911 is present. In the case where the unused position serving as the line-of-sight candidate is present (S917: YES), the CPU 3 advances the processing to Step S911. In the case where the unused position serving as the line-of-sight candidate is not present (S917: NO), the CPU 3 returns the processing to Step S901.

With the above-described processing, the eye part (priority=1) is selected as the line-of-sight candidate position, and the processing in Steps S911 to S916 is executed. Note that, in the line-of-sight candidate position table in FIG. 10A, the gravity center position, the foreleg, and the hind leg (priority=2 to 4) are not used as the line-of-sight candidate positions. Consequently, the CPU 3 returns the processing from Step S917 to Step S911, and selects the position having the highest priority (the gravity center position in this case) from among the unused line-of-sight candidate positions as the position of the line-of-sight candidate in Step S911.

Figure 11A:
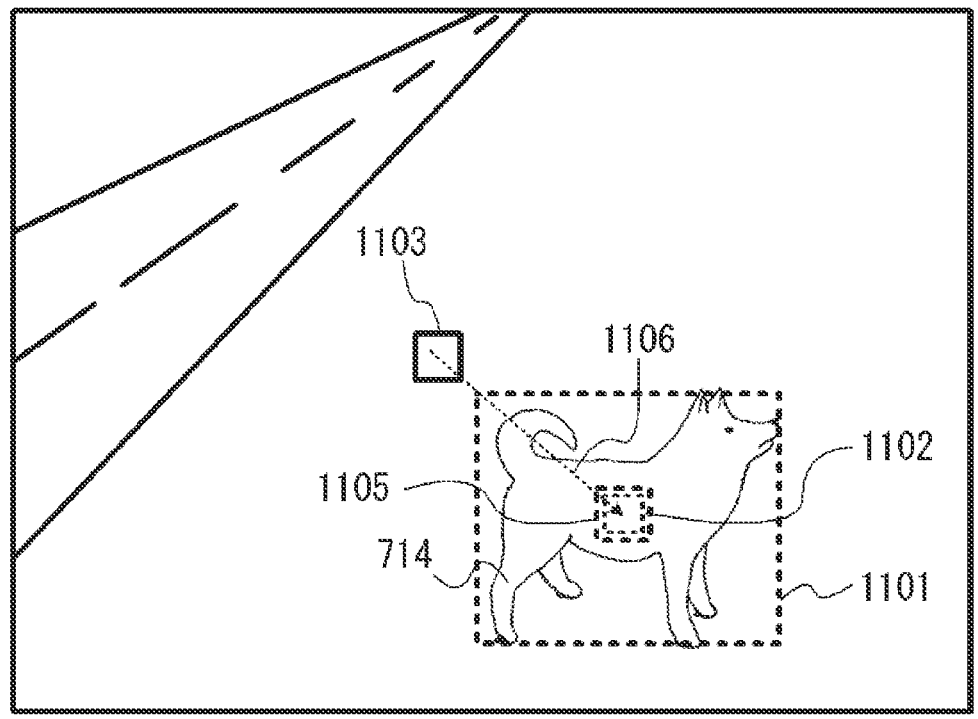
FIGS. 11A and 11B are other views for explaining the correction method of the line-of-sight detection position.
Figure 11B:
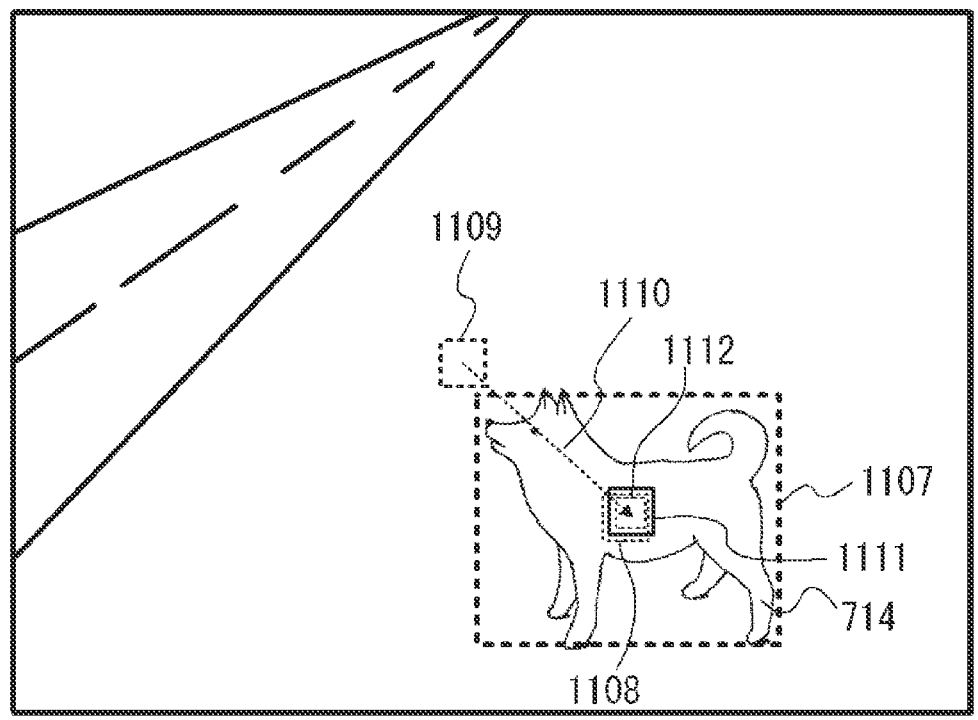

With reference to FIGS. 11A and 11B, a description will be given of processing in the case where the user watches the gravity center position of the subject 714 and the CPU 3 selects the gravity center position of the subject 714 as the line-of-sight candidate position. Note that examples in FIGS. 11A and 11B correspond to the examples in FIGS. 8A and 8B.

In Step S912, the CPU 3 calculates an offset 1106 from a difference between a line-of-sight detection position 1103 before correction and a gravity center detection position 1105. Next, in Step S913, the CPU 3 updates the correction value for line-of-sight detection of the line-of-sight detection circuit 201 by using the offset 1106 calculated in Step S912. As a result, in the camera 1, the position obtained by correcting the line-of-sight detection position detected by the line-of-sight detection circuit 201 with the offset 1106 serves as the line-of-sight detection position after correction.

Next, in Step S914, the CPU 3 determines whether or not the predetermined time period has elapsed. The CPU 3 advances the processing to Step S915 at the point of time when the predetermined time period has elapsed (S914: YES).

Next, in Step S915, the CPU 3 calculates the degree of matching between the line-of-sight detection position which is corrected by using the correction value updated in Step S913 and the line-of-sight candidate position 1105, and determines the calculated degree of matching with the threshold value. FIG. 11B shows an example of a state in which the dog serving as the subject 714 shown in FIG. 11A moves, the orientation thereof is flipped horizontally, and the posture thereof is changed.

The example shown in FIG. 11B shows the case where the user watches the gravity center position of the subject 714, and the detected subject 714 is surrounded by a rectangular subject detection frame 1107. In addition, the user watches a watch position 1108 indicated by the dotted-line frame corresponding to the gravity center position of the subject 714 continuously from the state in FIG. 11A. The line-of-sight detection position detected by the line-of-sight detection circuit 201 is a line-of-sight detection position 1109 indicated by the dotted-line frame. In addition, the position to which an offset 1110 (identical to the offset 1106 in FIG. 11A) is applied by using the correction value updated in Step S913 is a line-of-sight detection position 1111 after correction indicated by the solid-line frame.

In addition, in the example in FIG. 11B, the line-of-sight candidate position is an eye part detection position 1112 detected by the subject detection circuit 207. Consequently, even when the state of the subject 714 is changed from the state of the subject 714 in FIG. 11A to the state of the subject 714 in FIG. 11B, the watch position 1108 which the user watches, the line-of-sight detection position 1111 after correction, and the eye part detection position 1112 match each other.

In Step S914, the CPU 3 determines whether or not the predetermined time period has elapsed. The CPU 3 advances the processing to Step S915 at the point of time when the predetermined time period has elapsed (S914: YES). Subsequently, in Step S915, the CPU 3 calculates the degree of matching between the line-of-sight detection position 1111 after correction and the eye part detection position 1112.

Next, in Step S916, the CPU 3 determines whether or not the degree of matching calculated in Step S913 is not less than the predetermined threshold value. In the example shown in FIG. 11B, the degree of matching is not less than the threshold value (S916: YES), and the CPU 3 ends the processing in the flowchart in FIG. 9.

In the present embodiment, also in the case where the size of the subject which the user watches in the angle of view of the camera 1 is larger than a predetermined size, it is possible to correct the offset between the line-of-sight detection position by the camera 1 and the position in the subject which the user actually watches with high accuracy. With this, in the camera 1, it becomes possible to cause the line-of-sight detection position after correction to match the watch position of the user with high accuracy.

While the foregoing is the description of the embodiments related to the technique in the present disclosure, the above embodiments only describe examples of the configuration of the techniques in the present disclosure illustratively. The techniques in the present disclosure are not limited to the above specific modes, and can be variously modified within the scope of the technical idea. For example, in Steps S604 and S904, when the subject serving as the candidate for the line-of-sight position is determined, the camera 1 may be configured so as to preferentially select the subject specified in advance by the user instead of being based on the photographing mode and the distance between the line-of-sight detection position and the detected subject. An example of a method for specifying the subject serving as the candidate for the line-of-sight position in advance in the camera 1 includes a method in which identification information (individual information) of the user including information for specifying the subject is stored in the memory unit 4. With this, the CPU 3 can select a more suitable subject serving as the candidate for the line-of-sight position for each user based on the identification information stored in the memory unit 4.

In addition, in the embodiments described above, the CPU 3 selects the position of the line-of-sight candidate based on the priority of the line-of-sight position candidate table stored in the memory unit 4. Instead of or in addition to this, the CPU 3 may select the position of the line-of-sight candidate based on information related to the subject including the size of the detected subject and image information, such as contrast of the image, of the detected subject.

In addition, in the embodiments described above, the priority of the line-of-sight position candidate table stored in the memory unit 4 may be changed according to the relative size of the subject area with respect to the angle of view in the image displayed by the display device 10. Further, the priority of the line-of-sight position candidate table may also be changed based on information indicative of a tendency of the feature position which the user watches. For example, in the embodiments described above, in the case where the information indicates a tendency in which the foreleg of the dog is watched, the CPU 3 selects the foreleg position of the subject 714 as the position of the line-of-sight candidate first. The information indicative of the tendency of the feature position which the user watches may be information common to a plurality of users, and may also be information for each user. For example, identification information (individual information) of a user, that includes information indicative of the tendency of the feature position which the user watches, may be stored in advance in the memory unit 4. With this, the CPU 3 changes the priority of the line-of-sight position candidate table by using the identification information. Subsequently, the CPU 3 can select the feature position of the subject which the user tends to watch as the position of the line-of-sight candidate by selecting the position of the line-of-sight candidate based on the priority after the change of the priority. Note that an example of the identification information (individual information) of the user includes individual authentication data. An individual authentication unit configured to authenticate the user may be provided in the camera 1, and the individual authentication data is used in the case where user authentication by the individual authentication unit is successful. The individual authentication unit can be implemented by using a known technique, and hence the detailed description thereof will be omitted.

In addition, in the embodiments described above, when the position of the detected subject is selected again in S601, the line-of-sight detection circuit 201 may select the position of the detected subject based on, in addition to or instead of the distance from the line-of-sight detection position, a movement direction of the line of sight of the user (line-of-sight detection position). For example, in Step S601, in the image displayed in the display device 10, the CPU 3 preferentially selects the position of the subject which moves substantially in the same direction as the movement direction of the line of sight of the user as the position of the detected subject. With this, it is possible to cause the subject which the user watches and the detected subject selected in Step S601 to match each other with higher accuracy.

Further, in the embodiments described above, at least one of the line-of-sight detection position, the subject detection position, and the position of the line-of-sight candidate may be displayed in the display device 10. For example, as shown in the drawings in the above description, the display device 10 can display the individual positions with the rectangles in the solid line or the dotted line. In addition, in the embodiments described above, the subject to be detected is not limited to the animals shown as the examples, and may be other subjects, such as a person, an automobile, a motorcycle, and an electric train, and these subjects may be mixed.

Further, in the embodiments described above, instead of the CPU 3, the line-of-sight detection circuit 201 may be configured to detect the line-of-sight position of the user with respect to the display device 10.

OTHER EMBODIMENTS

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the techniques in the present disclosure, it is possible to correct a difference between the line-of-sight detection position and the position which the user actually watches with high accuracy without causing the user to manually perform the correction processing.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-104994, which was filed on Jun. 24, 2021 and which is hereby incorporated by reference herein in its entirety.

What is claimed is:

1. A line-of-sight detection apparatus comprising:
a processor; and
a memory storing a program which, when executed by the processor, causes the line-of-sight detection apparatus to function as:
a line-of-sight detection unit configured to detect a position of a line of sight of a user with respect to a display unit,
a line-of-sight position correction unit configured to correct the position of the line of sight detected by the line-of-sight detection unit by using a correction value,
a subject detection unit configured to detect a subject from an image displayed in the display unit, and
a correction value determination unit configured to determine the correction value used by the line-of-sight position correction unit such that the position of the line of sight corrected by the line-of-sight position correction unit matches a position of the subject detected by the subject detection unit,
wherein the correction value determination unit determines the correction value such that, in a case where a plurality of subjects are detected, the position of the line of sight corrected by the line-of-sight position correction unit matches a first subject of the plurality of subjects, and
wherein the correction value determination unit determines the correction value such that, in a case where a degree of matching between the position of the line of sight corrected by the line-of-sight position correction unit and the first subject does not satisfy a predetermined condition, the position of the line of sight corrected by the line-of-sight position correction unit matches a subject which is different from the first subject, among the plurality of subjects.

2. The line-of-sight detection apparatus according to claim 1, wherein the correction value determination unit determines the correction value such that, in a case where the plurality of subjects are detected, the first subject or the subject which is different from the first subject are present in a predetermined area in the image.

3. The line-of-sight detection apparatus according to claim 2, wherein, in a case where a plurality of types of subjects are detected from the image, the correction value determination unit selects, according to information indicating which type of subject is prioritized, a subject corresponding to the type indicated by the information from among the plurality of subjects.

4. The line-of-sight detection apparatus according to claim 2, wherein the correction value determination unit selects the first subject from among the plurality of subjects, based on information which specifies a subject used in determination of the correction value.

5. The line-of-sight detection apparatus according to claim 4, wherein the correction value determination unit selects the subject which is determined, the position of the line of sight that is detected by the line-of-sight detection unit being a reference.

6. The line-of-sight detection apparatus according to claim 1, wherein
the correction value determination unit determines the correction value such that, after a lapse of a predetermined time period, in a case where the degree of matching between the position of the line of sight corrected by the line-of-sight position correction unit and the first subject is less than a predetermined threshold value, the position of the line of sight corrected by the line-of-sight position correction unit matches a subject which is different from the first subject, among the plurality of subjects.

7. The line-of-sight detection apparatus according to claim 1, wherein
the subject detection unit detects a feature position of the detected subject, and
the correction value determination unit determines the correction value such that the position of the line of sight corrected by the line-of-sight position correction unit matches the feature position.

8. The line-of-sight detection apparatus according to claim 7, wherein the subject detection unit detects, in a case where the detected subject is a living thing, an organ of the subject, and detects a position of the detected organ as the feature position.

9. The line-of-sight detection apparatus according to claim 7, wherein the subject detection unit detects the feature position according to a shape of a subject area of the detected subject.

10. The line-of-sight detection apparatus according to claim 9, wherein the subject detection unit uses a geometric gravity center position of the subject area as the feature position.

11. The line-of-sight detection apparatus according to claim 7, wherein, in a case where a plurality of feature positions are detected, the correction value determination unit selects any of the plurality of feature positions as a feature position, which the position of the line of sight corrected by the line-of-sight position correction unit is caused to match, according to a priority of each of the plurality of feature positions.

12. The line-of-sight detection apparatus according to claim 11, wherein the priority of each of the plurality of feature positions is changed according to a relative size of a subject area with respect to an angle of view in the image.

13. The line-of-sight detection apparatus according to claim 11, wherein the priority of each of the plurality of feature positions is changed according to contrast of the image.

14. The line-of-sight detection apparatus according to claim 7, wherein
the correction value determination unit determines the correction value such that, in a case where a plurality of feature positions of the detected subject are detected, the position of the line of sight corrected by the line-of-sight position correction unit matches any of the plurality of feature positions, and
the correction value determination unit determines the correction value such that, after a lapse of a predetermined time period, in a case where a degree of matching between the position of the line of sight corrected by the line-of-sight position correction unit and the any of the plurality of feature positions is less than a predetermined threshold value, the position of the line of sight corrected by the line-of-sight position correction unit matches a feature position which is different from the any of the plurality of feature positions, among the plurality of the feature positions.

15. The line-of-sight detection apparatus according to claim 7, wherein the correction value determination unit determines the correction value such that the position of the line of sight corrected by the line-of-sight position correction unit matches a feature position of a subject which the user tends to watch.

16. The line-of-sight detection apparatus according to claim 1, wherein the correction value determination unit determines the correction value such that, in a case where a time period in which the position of the line of sight of the user corrected by the line-of-sight position correction unit and the first subject detected by the subject detection unit continuously overlap each other is less than a predetermined time period, the position of the line of sight corrected by the line-of-sight position correction unit matches a position of another subject detected by the subject detection unit.

17. The line-of-sight detection apparatus according to claim 1, wherein the display unit displays, in the image, a mark indicative of the position of the line of sight of the user corrected by the line-of-sight position correction unit.

18. The line-of-sight detection apparatus according to claim 1, wherein the display unit displays, in the image, a mark indicative of a position of the subject detected by the subject detection unit.

19. The line-of-sight detection apparatus according to claim 17, wherein the display unit is an electronic display viewfinder which allows contact of an eye part of the user and displays the mark.

20. An imaging apparatus comprising:
an imaging unit; and
the line-of-sight detection apparatus according to claim 1, wherein the line-of-sight detection apparatus performs control such that the image captured by the imaging unit is displayed in the display unit, and corrects a line of sight of an eye which looks at the image.

21. A line-of-sight detection method comprising:
detecting a position of a line of sight of a user with respect to a display unit;
detecting one or more subjects from an image displayed in the display unit;
determining a correction value such that the position of the line of sight matches a position of one of the one or more subjects, wherein, in a case where the one or more subjects include a plurality of subjects, the position of the line of sight corrected by using the correction value matches a first subject of the plurality of subjects, and wherein, in a case where a degree of matching between the position of the line of sight corrected by the correction value and the first subject does not satisfy a predetermined condition, the position of the line of sight corrected by using the correction value matches a subject which is different from the first subject, among the plurality of the subjects; and
correcting the position of the line of sight by using the correction value.

22. A non-transitory computer-readable storage medium storing a program for causing a computer to function as:
a line-of-sight detection unit configured to detect a position of a line of sight of a user with respect to a display unit;
a line-of-sight position correction unit configured to correct the position of the line of sight detected by the line-of-sight detection unit by using a correction value;
a subject detection unit configured to detect a subject from an image displayed in the display unit; and
a correction value determination unit configured to determine the correction value used by the line-of-sight position correction unit such that the position of the line of sight corrected by the line-of-sight position correction unit matches a position of the subject detected by the subject detection unit,
wherein the correction value determination unit determines the correction value such that, in a case where a plurality of subjects are detected, the position of the line of sight corrected by the line-of-sight position correction unit matches a first subject of the plurality of subjects, and
wherein the correction value determination unit determines the correction value such that, in a case where a degree of matching between the position of the line of sight corrected by the line-of-sight position correction unit and the first subject does not satisfy a predetermined condition, the position of the line of sight corrected by the line-of-sight position correction unit matches a subject which is different from the first subject, among the plurality of subjects.

23. The line-of-sight detection apparatus according to claim 1, wherein the correction value determination unit determines the correction value based on a difference between the position of the line of sight detected by the line-of-sight detection unit and the position of the subject detected by the subject detection unit.

* * * * *